Patented Apr. 1, 1952

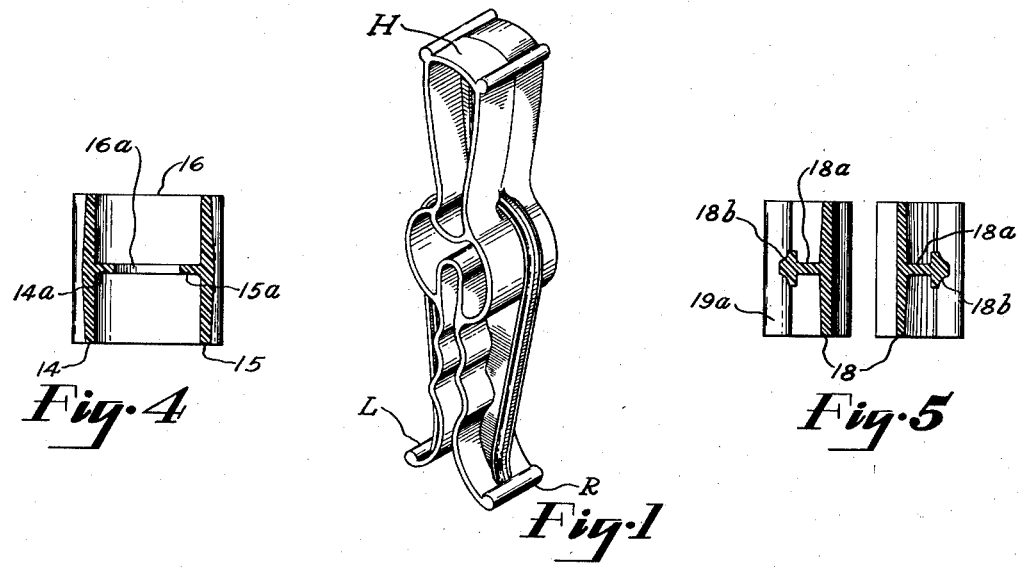
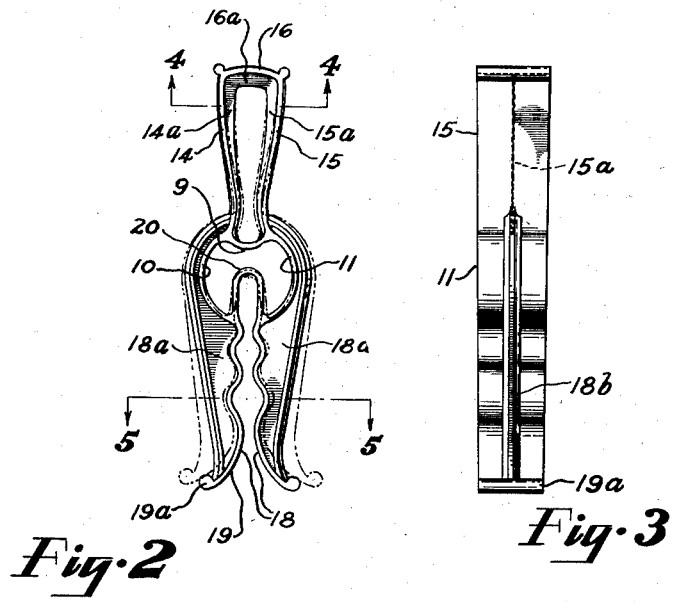

2,591,477

UNITED STATES PATENT OFFICE 2,591,477

PLASTIC CLOTHESPIN

John B. Tegarty, Mentor, Ohio, assignor to T. R. Zettelmeyer, Willoughby, Ohio, as trustee Application July 29, 1949, Serial No. 107,460

5 Claims. (Cl. 24—137)

This invention relates to clothespins formed of thermoplastic materials and has for its general object the provision of a relatively highly flexible, sturdy pin structure which can be economically produced by injection molding methods.

More specifically, the present invention constitutes a novel improvement in plastic pin structures of the general type wherein the clothes gripping leg members are integrally molded with a top joining structure in the form of a handle. The present development is such as to meet the several structural and functional requirements which I have found are conducive to a successful product. One of the features of the disclosed structure is that the required spread of the line gripping legs can be obtained without increasing the over-all amount of plastic material required to produce the pin. Another feature is that the structure, while being such as to produce the proper gripping force on the line, has been developed particularly to facilitate ready extraction of the product from the mold in that the cross-sectional areas of the various portions of the integral structure are comparatively uniform while having draft allowance relative to a central mold parting plane.

A further object is the provision in a plastic molded pin of a hollow handle, the hollowness of which causes the handle sides to become part of the flexible beam structure of the legs, thus increasing the length of the effective beam action without increasing the over-all length of the pin.

A still further object is the provision of a plastic pin having such structural characteristics as to permit over-all shortening of the pin while maintaining a satisfactory clamping function and facility of use.

In the drawings:

Fig. 1 is a perspective view of my new plastically molded clothespin;

Fig. 2 is a front elevation of the pin in an unflexed or normal condition with an indication of the various flexing portions thereof indicated by the dot and dash lines;

Fig. 3 is a side elevation of the clothespin;

Fig. 4 is a cross-sectional view taken through the handle portion along the plane indicated by the line 4—4 in Fig. 2; and Fig. 5 is a cross-sectional view taken through the legs of the pin along the plane indicated by the line 5—5 in Fig. 2.

In plastic clothespin structures of the general type to which the present invention relates various structures and plastic materials have been resorted to in order to meet the utilitarian requirements of the pin while attempting to conserve molding material. In my prior Patent No. 2,433,171, issued December 23, 1947, I disclosed a plastic clothespin wherein hollow or double walled leg structures were incorporated to join a solid handle portion thereby to obtain the required strength of line grip and beam flexibility without increasing too much the overall plastic volume of the pin structure. While the utility of that pin was found to be satisfactory, persistent difficulty in extraction of the pin from the mold, due to the hollow, double-walled character of the leg structure, interfered with the obtaining of the desired economy in production.

I have found that it is possible to decrease the local flexing sensitivity of the leg structures through elimination of the hollow structural feature while obtaining the same extent of separation of the leg portions by making the handle portion hollow whereby the sides of the handle flex inwardly as the leg portions are flexed outwardly. To accomplish this I have devised an integral fulcrum structure associated with the crotch structure and all in a manner to properly distribute the tensile stresses and prevent fracturing of the pin.

Referring to the drawings, it will be noted that the clothespin is shown as being of substantial and uniform width, i. e., with the side edges of all portions or parts terminating in two parallel planes. Generally a hollow handle portion H is joined to two symmetrical, solid leg portions L and R by a fulcrum structure comprising a concave web 9 and arcuate webs 10 and 11. Handle sides 14 and 15 are shaped to converge from the top connecting web 16 thereof downwardly to the concave fulcrum portion 9.

The legs L and R are generally of a T-section construction having clothes gripping webs 18 provided with camming or piloting surfaces 19. The gripping webs extend upwardly into the confines of the arcuate portions 10 and 11 to terminate in a U-shaped flexing portion 20. The webs 18 are reinforced with centrally located ribs or beam portions 18a which extend from the bottom bead formations 19a upwardly and outwardly and around the arcuate webs 10 and 11 and in upper shape follow the arcuate shape of the webs 10 and 11 to the lower converging portions of the lateral handle webs 14 and 15. These beam portions 18a are provided with an outer rail or head structure 18b throughout the length thereof, which increases the deflecting strength of the beam and leg formation.

The lateral handle webs 14 and 15 are provided with centrally located ribs or beam webs 14a and 15a, respectively, which are connected by a web 16a. The webs 14a and 15a decrease in beam depth as the handle webs 14 and 15 converge downwardly and merge into the upper surface of the fulcrum portion 9.

The gripping webs 18 may be of the grooved formation shown for engagement with varying thicknesses of clothing when on the line. When the leg elements are flexed outwardly as, for example, to a position indicated by the dot and dash lines in Fig. 2, the arcuate webs 10 and 11 and the U-portion 20 connecting the upper ends of the leg webs 18 are flexed as indicated and the fulcrum web 9 is placed in compression. Due to the beam structure of the legs and the continuation of that beam formation up and around the arcuate webs 10 and 11 the low reaches of the handle webs and beam structure thereof are flexed inwardly as indicated in Fig. 2. The U web 20, by reason of its location relative to the fulcrum web 9, is in tension when the fulcrum web is in compression. The mold parting line will be in a longitudinal central plane bisecting the outer and inner beam webs and appropriate draft or slope in the web structure is provided for quick extraction of the product.

In the claims, "transverse," "transversely extending webs," or similar terminology is used to describe the ribbon-like structure of the leg or gripping portions 18, arcuate portions 10 and 11, the fulcrum portion 9, the loop 20, and the lateral portions 14 and 15 and top portion 16 of the handle. "Transverse" or "transversely extending" signifies that these ribbon-like web structures have the widths thereof extending perpendicular to a plane which would be at right angles to a clothes line when the pin is in normal use.

I have found that a clothespin structure having an overall width of about $\frac{7}{16}$ of an inch, an overall height of about 2.5 inches, and with all of the web sections or portions about $\frac{1}{32}$ of an inch thick will have both the gripping strength and the tensile strength to meet the requirements, and that the overall size thereof is such as to be handled most conveniently. Further weight reduction can be effected by making the clothes gripping webs from the bottom up to the arcuate webs 10 and 11 considerably thinner than $\frac{1}{32}$ of an inch. Commercial forms of polystyrene thermal molding compounds have been found to be the most economical from both a base material and ejection molding viewpoint although the pins could be made of acrylic resin, cellulose acetate or other suitable thermo-plastic materials of the proper tensile strength in the final molded condition.

It will be noted that by taking full advantage of the flexibility of the handle sides or webs and the fulcrum web and the crotched loop connecting the leg webs can be so proportioned and located relative to each other and to the arcuate spring webs 10 and 11 that the resulting tensile stresses, when the leg structures are forced apart, will be distributed and not be concentrated at any particular point. The reversed arcuate fulcrum web and the crotched loop 20 both serve to add to the leg clamping force when flexed as indicated. The structure is such that the crotched loop 20 may extend upwardly a considerable distance toward the fulcrum web, thus permitting an over-all shortening of the pin structure and a corresponding and important saving of material. I have found, for example, that with a pin of the size hereinbefore stated it is possible to obtain a production of from 170 to 180 pins per pound of molding material as compared to the most favorable production of 120 pins per pound of prior pin structure mentioned.

I claim:

1. A unitary plastic clothespin structure comprising a pair of leg members integrally formed with transverse webs having a clothesline receiving slot therebetween, the leg members constituting the walls of said slot being formed without voids or perforations for substantially their entire length, with the slot terminating at its upper closed end in a free loop-shaped flexible spring action transverse web portion, the leg webs having transverse arcuate web portions formed at the upper ends of the leg members with the spring action portion extending into the void between said arcuate portions, a reverse radius flexible spring action fulcrum member formed at the upper ends of said arcuate portions of the leg webs, and a spring action handle member joined to said arcuate portions of said leg members, said component parts being so arranged as to permit relative movement between said loop-shaped spring action portion and said fulcrum member longitudinally of the pin and to provide means of transmitting the major portion of flexing strain to said spring action handle member, thereby minimizing the strain on and supplementing the spring action of said fulcrum member and said free loop-shaped portion and providing a multiple spring action structure adapted to preclude straining beyond the normal flexual limits of any one or all of the component spring action parts while under stress of normal use.

2. An integrally molded plastic clothespin having a hollow handle comprised of a transversely extended top web, and transversely extended lateral webs joined thereto, a transversely extended fulcrum web connecting the said lateral webs at the bottom of said handle, said fulcrum web being bowed toward the bottom of the pin structure, transversely webbed leg structures curving at the top portions thereof to join the external lateral web surfaces of the handle structure, the said top portions having concave opposed inner surfaces, and an internally disposed crotch loop within the concave opposed inner surfaces of the leg structures and physically free thereof for connecting uncurved parts of the leg structures, said crotch loop extending upwardly toward said downwardly bowed fulcrum web.

3. A unitary molded plastic clothespin comprising a transversely extended hairpin-shaped web providing clothespin leg portions with a slot therebetween, an open bodied handle structure of transverse webs comprising a top web and two lateral webs joined to said top web and directed convergently downward therefrom, outwardly bowed transverse webs connecting the bottom of said lateral webs to the leg portions of said hairpin-shaped web, a transversely extended downwardly bowed fulcrum web disposed between said lateral webs at the bottom portions thereof where said lateral webs join the said outwardly bowed webs, and external strengthening ribs running the length of said leg portions over said outwardly bowed webs to merge into the bottom external portions of said lateral webs above the said fulcrum web, said strengthening ribs being disposed at the longitudinal mid-plane of the pin.

4. A thermo-plastic clothespin having a hollow handle and leg structures comprising transversely extending web formations, the leg structures each being connected to the handle by outwardly bowed arcuate transverse webs, the leg webs being connected at the upper ends thereof by an inverted loop-shaped flexible web, with the loop formation freely disposed within the confines of the said arcuate webs, external beam webs centrally located on the leg webs with the beam portions extending around the said arcuate webs to the handle webs and joined thereto above the bottom terminus of the handle structure to prevent flexing of the gripping portions of the legs, and the bottom terminus of the handle structure comprising a fulcrum web arched in a direction opposite to the loop formation connecting the leg structures.

5. A thermo-plastic clothespin having a hollow handle and leg structures comprising transversely extending web formations connected by transverse arcuate webs, the leg webs being connected by an inverted loop-shaped, flexible crotch web disposed within the confines of the said arcuate webs, an internal web centrally located as a rib within the handle webs and tapering in rib depth decreasingly toward the bottom of the handle webs whereby the sides of the handle structure are correspondingly increasingly flexible, an external beam web centrally located on each leg web and extending around the arcuate web to the handle web and joined thereto above the bottom terminus of the handle structure, said internal and external webs being located at a common longitudinal plane, and a downwardly arched fulcrum strut connecting the top regions of the arcuate webs and comprising the bottom terminus of the handle structure.

JOHN B. TEGARTY.

REFERENCES CITED

The following references are of record in the file of this patent:

UNITED STATES PATENTS

| Number | Name | Date |
|---|---|---|
| D. 137,583 | Lytle | Apr. 4, 1944 |
| 2,433,171 | Tegarty | Dec. 23, 1947 |